Oct. 13, 1953     J. W. OVERBEKE     2,655,173

PISTON ACTUATED SLEEVE TYPE RELIEF VALVE

Filed Oct. 8, 1949

Inventor
JOHN W. OVERBEKE

By    *John N. Wolfram*
Agent

Patented Oct. 13, 1953

2,655,173

UNITED STATES PATENT OFFICE 2,655,173

PISTON ACTUATED SLEEVE TYPE RELIEF VALVE

John W. Overbeke, Cleveland Heights, Ohio, assignor to The Parker Appliance Company, Cleveland, Ohio, a corporation of Ohio Application October 8, 1949, Serial No. 120,305

2 Claims. (Cl. 137—469)

This invention relates to relief valves and particularly to the seatless or sleeve type in which the flow of fluid through the valve is controlled by a cylindrical valve member covering and uncovering a radial port in another cylindrical member.

The body in which the relief valve parts are housed is usually the most expensive part to manufacture since it is the largest part of the assembly and usually requires the most machining operations. This is particularly true when the internal relief valve parts are incorporated within a body which also houses other types of functioning units, as for example hydraulic directional control valves. In such cases the manufacturing cost of the body alone is usually the major portion of the cost of the entire assembly. For this reason it is desirable to eliminate as many close machining dimensions and tolerances in the body as possible since this will directly reduce the chances of ruining the body during manufacture.

The holding of close fits between parts often makes selective assembly desirable or even necessary. When one of the parts is subsequently worn out or damaged in service it is usually impractical to selectively fit the assembly with a replacement part. When close fits of this nature are required between a relief valve body and one of the working parts, damage to the part may cause the more expensive body to be scrapped or may result in replacement by an improperly fitting part which will affect performance.

With the above considerations in view, it is an object of the present invention to provide a relief valve of the type described in which the holding of close dimensions on the valve body is avoided.

It is another object to provide a relief valve of the type described in which none of the working parts are required to be a close fit with any of the valve body surfaces.

Another object is to provide a high performance type valve in which the internal working parts may be selectively assembled to each other but in which the subassemblies so formed are freely interchangeable within the bodies.

Another object is to provide a sleeve type relief valve in which an area exposed to fluid under pressure and effective for urging the movable valve member toward open position may be of any desired diameter and fixed at any desired amount irrespective of the diameters or areas of the valve sealing surfaces and flow passages so that low rate springs may be used for biasing the valve to closed position.

It is another object to provide a sleeve type relief valve in which the diameter of the effective area may be kept as small as desired regardless of the diameters of the valve sealing surfaces or flow passages so that variations in the diameter due to tolerances, wear, etc., will produce minimal changes in the effective area and hence in the performance characteristics of the valve.

Another object is to provide a sleeve type valve in which pressure of fluid tending to open the valve is transmitted to the valve member solely by a pin having any predetermined area as desired exposed to the pressure of the fluid whereby the performance characteristics of the valve may be more readily controlled.

Other objects of the invention will be apparent from a detailed description and from the drawings in which.

Figure 1:
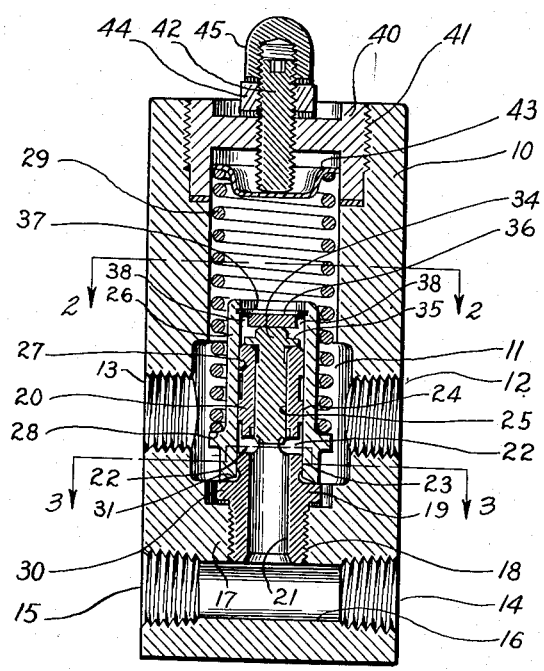
Fig. 1 is a longitudinal section through the valve.
Figure 2:
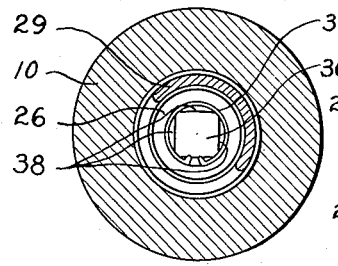
Fig. 2 is a sectional view along the lines 2—2 of Fig. 1.
Figure 3:
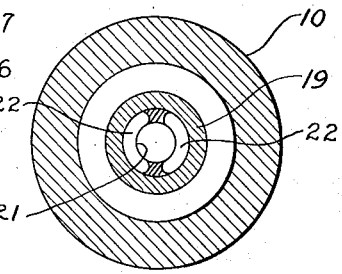
Fig. 3 is a sectional view along the lines 3—3 of Fig. 1.

In the illustrated embodiment of the invention the valve has a body 10 having a valve chamber 11 with a pair of outlet ports 12 and 13 leading therefrom. Spaced from the outlet ports are a pair of pressure inlet ports 14 and 15 connected to each other by a pressure passage 16.

A wall 17 separates the pressure passage 16 from the valve chamber 11 and has a threaded aperature 18 in which a valve guide member 19 is rigidly mounted. The guide member 19 has a cylindrical extension 20 which projects into the valve chamber 11 but is spaced from the walls of the chamber so as to be out of contact therewith. The guide member has a longitudinal bore 21 open to the pressure passage 16 and intersecting lateral openings 22 in the cylindrical extension 20. On either side of the openings 22 the guide member has cylindrical sealing surfaces 23 and 24. A second bore 25 leads from the first mentioned bore 21 to the upper end of the guide member.

Mounted on the guide member and out of contact with both the end and side walls of the valve chamber 11 is a cylindrical sleeve valve 26 having a bore 27 which is a close sliding fit with the sealing surfaces 23, 24 of the guide member. This sliding fit constitutes a fluid tight seal between the two parts and when the sleeve valve overlaps both of the surfaces 23, 24, as shown in the drawing, fluid from within the pressure passage 16 and the bore 21 is prevented from passing through the openings 22 to the valve chamber 11.

Toward its lower end the valve sleeve 26 has an abutment shoulder 28 against which a spring 29 bears for urging the sleeve valve toward closed position. Movement of the sleeve valve in the closing direction is limited by the engagement of its lower end with a flange 30 formed on the guide member. The lower end of the sleeve valve is preferably inwardly beveled as at 31 to provide an inclined surface against which relief fluid, passing through the openings 22, may impinge to increase the opening force acting upon the sleeve valve.

Slidably mounted within the bore 25 of the guide member and in sealing relation therewith is a pin 34 having a flange 35 adapted to engage the outer end of the guide member so as to limit the extent to which the pin may enter the bore 25. The outer end of the pin is engageable with a thrust member 36 retained within the sleeve valve by a snap ring 37. The thrust member 36 is cut away as at 38 to permit any fluid which may leak by the pin 34 within the bore 25 to have free access to the valve chamber 11.

The upper end of the valve chamber 11 is closed by a cap 40 threaded into the body as at 41. Extending through the cap is an adjusting screw 42 whose inner end bears against a spring follower 43 which in turn bears against the spring 29. Externally of the cap is a lock nut 44 for locking the adjusting screw 42 in any desired position. The end of the adjusting screw is protected by a cap nut 45.

In operation the valve is installed with either or both of the inlet ports 14 and 15 in communication with a pressure line and with either or both of the outlet ports 12 and 13 connected to an exhaust or return line. When thus installed, fluid under pressure entering through the pressure ports has access to passage 16 and the guide member bore 21 and lateral openings 22 and acts against the lower end of the pin 34 which transmits the pressure to the valve sleeve 26 through the thrust member 36 and snap ring 37. While the valve is closed the fluid under pressure within the openings 22 is sealed off at the surfaces 23 and 24. When the pressure of the fluid exceeds a predetermined value to overcome the opposing force of the spring 29 the sleeve valve 26 will be moved upwardly to uncover the lateral openings 22. This will permit some of the fluid to pass into the valve chamber 11 and then into the return line through the ports 12 and 13 and thus relieve the pressure of the fluid in the well known manner. When the pressure in passage 16 drops to or slightly below the predetermined value the spring will return the sleeve valve to close off the openings 22.

It will be noted that when the valve is closed fluid under pressure within the guide member bore 21 and openings 22 does not react directly against any portion of the sleeve valve 26 for moving it in a longitudinal or valve opening direction. The sole force provided by the fluid for urging the sleeve valve toward open position is that exerted against the bottom end of the pin 34 and is proportional to the area thereof. Thus by changing the diameters of the pin and the bore 25 either a lesser or greater total force may be transmitted to the sleeve valve when any given unit fluid pressure prevails.

In most instances it is desirable to keep the exposed area of the pin 34 to a relatively small amount so that a light or low-rate spring may be used. Such springs minimize hunting and pressure fluctuations and permit a more sensitive adjustment of the valve opening pressure.

It will be noted that the diameter, and hence the cross-sectional area, of the pin 34 and the bore 25 may be varied independently of the diameters or areas of the flow passage 21, openings 22, and of the sealing surfaces 23, 24. Since the cross-sectional area of the pin 34 is the sole effective area for transmitting fluid pressure to the sleeve valve it is apparent that the force transmitted to the sleeve valve may be of any selected predetermined value and may be made as small as desired regardless of the flow passage or sealing surface areas. Since the pin 34 is of relatively small diameter changes in the diameter due to tolerances, wear, etc., will produce only very small changes in the effective area and thus produce only minimal changes in the performance characteristics of the valve.

It will be noted that although the guide member 19 is attached to one wall 17 of the valve chamber 11 it is spaced from and out of contact with all the remaining walls. The sleeve valve 26 is entirely supported and guided on this guide member and is out of contact with both the end and side walls of the chamber 11. The only surfaces which must be closely fitted to each other are the sleeve valve bore 27 in relation to the valve guide sealing surfaces 23, 24, and the bore 25 of the guide member in relation to the outer diameter of the pin 34. The parts carrying these surfaces, namely the sleeve valve 26, guide member 19, and pin 34, are small and relatively inexpensive to manufacture, even though they require close tolerances and smoothly finished surfaces. They may be selectively fitted to each other to form a sub-assembly which may be interchangeably assembled in any of a group of valve bodies, thus facilitating original assembly and the replacement of parts in service. Since the valve body does not have any surfaces which must be held to a close sliding fit or to a fine finish, the manufacture of the body is correspondingly simplified, and there is less chance of machining it off dimension so as to spoil it.

Although but one embodiment of the invention is shown and described it is obvious that many detail changes may be made without departing from the scope of the invention as described in the following claims.

I claim:

1. A pressure relief valve comprising a casing having a valve chamber and a pressure chamber, an outlet port leading from the valve chamber and an inlet port leading to the pressure chamber, a guide member extending into said valve chamber and having a passage for connecting the pressure chamber to the valve chamber, a sealing surface on the guide member, a hollow sleeve valve slidably supported by said guide member and having a sealing surface cooperable with the sealing surface on the guide member for opening and closing said passage, means biasing the valve member toward closed position, said sleeve valve having a transverse wall beyond one end of said guide member, a pin slidably mounted within said guide member and having one of its ends engageable with said transverse wall, the other end of said pin being exposed to the pressure of fluid within said passage for urging the pin into engagement with said transverse wall whereby said sleeve valve is urged toward open position, and a duct in said sleeve valve for venting fluid leaking past said pin into said valve chamber.

2. A pressure relief valve comprising a casing having a valve chamber and a pressure chamber, an outlet port leading from the valve chamber and an inlet port leading to the pressure chamber, a guide member extending into said valve chamber and having a passage for connecting the pressure chamber to the valve chamber, a sealing surface on the guide member, a hollow sleeve valve slidably supported by said guide member and having a sealing surface cooperable with the sealing surface on the guide member for opening and closing said passage, means biasing the valve member toward closed position, a snap ring fixed within the hollow sleeve beyond one end of the guide member, a loose washer retained within the sleeve valve by said snap ring and forming a pin chamber between said washer and said one end of the guide member, a pin slidably mounted within said guide member and having an enlarged head within said pin chamber, one end of said pin being engageable with said washer and the other end being exposed to the pressure of fluid within said passage for urging the pin into engagement with said washer whereby said sleeve valve is urged toward open position, and a duct connecting said pin chamber to said valve chamber.

JOHN W. OVERBEKE.

References Cited in the file of this patent

UNITED STATES PATENTS

| Number | Name | Date |
| --- | --- | --- |
| 1,701,305 | Meyers | Feb. 5, 1929 |
| 2,059,759 | Stearns | Nov. 3, 1936 |
| 2,080,760 | Condon | May 18, 1937 |
| 2,087,037 | McCarthy | July 13, 1937 |
| 2,271,516 | Tobin | Feb. 3, 1942 |
| 2,278,437 | Gentzel | Apr. 7, 1942 |
| 2,481,018 | Johnson | Sept. 6, 1949 |